United States Patent
Mercat et al.

(10) Patent No.: US 12,275,494 B2
(45) Date of Patent: Apr. 15, 2025

(54) AUTOMATIC METHOD FOR CONTROLLING IN CURRENT-MODE A MOTOR FOR ASSISTING WITH PEDALLING ON AN ELECTRICALLY ASSISTED PEDAL CYCLE AND ELECTRICALLY ASSISTED PEDAL CYCLE INTENDED TO IMPLEMENT SUCH A METHOD

(71) Applicant: MAVIC GROUP, Epagny Metz-Tessy (FR)

(72) Inventors: Jean-Pierre Mercat, Chavanod (FR); Bérenger Alexandre, Pringy (FR)

(73) Assignee: MAVIC GROUP, Epagny Metz-Tessy (FR)

( * ) Notice: Subject to any disclaimer, the term of this patent is extended or adjusted under 35 U.S.C. 154(b) by 499 days.

(21) Appl. No.: 17/632,784

(22) PCT Filed: Jul. 8, 2020

(86) PCT No.: PCT/FR2020/000203
§ 371 (c)(1),
(2) Date: Feb. 3, 2022

(87) PCT Pub. No.: WO2021/023919
PCT Pub. Date: Feb. 11, 2021

(65) Prior Publication Data
US 2022/0289333 A1    Sep. 15, 2022

(30) Foreign Application Priority Data
Aug. 7, 2019  (FR) ..................................... 19 09052

(51) Int. Cl.
*B62M 6/50*       (2010.01)
*B62M 6/55*       (2010.01)

(52) U.S. Cl.
CPC ................ *B62M 6/50* (2013.01); *B62M 6/55* (2013.01)

(58) Field of Classification Search
CPC .................................. B62M 6/50; B62M 6/55
(Continued)

(56) References Cited

U.S. PATENT DOCUMENTS 8,117,923 B2    2/2012   Sasaki
2010/0282001 A1  11/2010  Sasaki
(Continued)

FOREIGN PATENT DOCUMENTS

| CN | 103770893 A | * 5/2014 | ............. B62M 6/55 |
|----|-------------|----------|------------------------|
| EP | 2 664 535 A1 | 11/2013 | |
| EP | 3 126 184 A1 | 2/2017 | |

OTHER PUBLICATIONS

International Search Report issued on Sep. 08, 2020 in PCT/FR2020/000203 filed Jul. 8, 2020, 2 pages.

*Primary Examiner* — Jacob D Knutson
(74) *Attorney, Agent, or Firm* — Oblon, McClelland, Maier & Neustadt, L.L.P.

(57) ABSTRACT

An automatic method for controlling in current-mode a motor for assisting with pedaling on an electrically assisted pedal cycle equipped with a sensor that measures a resultant force on its pedal and gear mechanism is provided, including injecting a control current into the motor to generate an assistance torque and computing the value of the assistance torque; computing a value of the longitudinal resultant of the assistance torque by applying a second coefficient of proportionality to the torque value computed in the preceding step; measuring a value of the longitudinal resultant of the total torque; computing a value of the longitudinal resultant of the torque exerted by the cyclist; computing an average value of the torque exerted by the cyclist over a fraction of
(Continued)

a crank rotation; computing the value of the assistance torque to be generated in the motor; and deducing the value of the current to be injected.

15 Claims, 7 Drawing Sheets

(58) Field of Classification Search
USPC .................................................. 180/206.3
See application file for complete search history.

(56) References Cited

U.S. PATENT DOCUMENTS

| | | |
|---|---|---|
| 2013/0311019 A1 | 11/2013 | Tanaka et al. |
| 2016/0009169 A1 | 1/2016 | Biderman et al. |
| 2016/0009179 A1 | 1/2016 | Biderman et al. |
| 2016/0009181 A1 | 1/2016 | Biderman et al. |
| 2016/0009223 A1 | 1/2016 | Biderman et al. |
| 2016/0009293 A1 | 1/2016 | Biderman et al. |
| 2016/0009334 A1 | 1/2016 | Biderman et al. |
| 2016/0009335 A1 | 1/2016 | Biderman et al. |
| 2016/0009336 A1 | 1/2016 | Biderman et al. |
| 2016/0009337 A1 | 1/2016 | Biderman et al. |
| 2016/0009338 A1 | 1/2016 | Biderman et al. |
| 2016/0009339 A1 | 1/2016 | Biderman et al. |
| 2016/0011003 A1 | 1/2016 | Biderman et al. |
| 2016/0011598 A1 | 1/2016 | Biderman et al. |
| 2016/0011599 A1 | 1/2016 | Biderman et al. |
| 2016/0012652 A1 | 1/2016 | Biderman et al. |
| 2016/0012721 A1 | 1/2016 | Biderman et al. |
| 2016/0012723 A1 | 1/2016 | Biderman et al. |
| 2016/0014205 A1 | 1/2016 | Biderman et al. |
| 2016/0014252 A1 | 1/2016 | Biderman et al. |
| 2020/0139805 A1 | 5/2020 | Biderman et al. |

* cited by examiner

AUTOMATIC METHOD FOR CONTROLLING IN CURRENT-MODE A MOTOR FOR ASSISTING WITH PEDALLING ON AN ELECTRICALLY ASSISTED PEDAL CYCLE AND ELECTRICALLY ASSISTED PEDAL CYCLE INTENDED TO IMPLEMENT SUCH A METHOD

The present invention relates to an automatic method for the current-mode control of a pedaling assistance motor on an electric power-assisted bicycle. The invention relates also to an electric power-assisted bicycle designed to implement such a method.

On an electric power-assisted bicycle, a user supplies a torque by actuating a crankset situated on the bicycle. In order to assist the user, an assistance torque can be supplied by an electric motor situated on the bicycle which, in this case, is an electric power-assisted bicycle. Advantageously, the electric power-assistance torque is proportional to the torque supplied by the user.

It is therefore necessary to know, at each instant, the value of the torque supplied by the user. This torque, which is exerted on a revolving shaft, can be determined advantageously by measuring its resultant on one of the bearings of the crankset, which makes it possible to have a direct, economical, robust and rapid wired link between the sensor and the control device of the motor. The relationship between this resultant and this torque depends on the number of teeth of the chainring on which the chain is engaged. It is therefore necessary to know this number of teeth.

To do this, it is known practice to place two sensors on the crankset, namely a first sensor, placed on the axis of the crankset, to measure the total force supplied by the cyclist and the assistance motor, and a second sensor, placed on the front derailleur, intended to determine the chainring with which the chain is engaged.

However, this solution presents drawbacks. In fact, it requires the addition of two sensors on the bicycle. It therefore complicates the assembly of the bicycle. Furthermore, it is not universal. Indeed, with it being possible for the derailleurs of different bicycles to have different technologies, it is impossible to imagine a single solution for mounting the second sensor on the derailleur.

It is these drawbacks that the invention sets out more particularly to remedy by proposing an automatic method for the current-mode control of a pedaling assistance motor on an electric power-assisted bicycle which is universal, that is to say which does not require a configuration specific to each crankset/derailleur assembly, and that is simpler to implement than the known methods.

To this end, the invention relates to an automatic method for the current-mode control of a pedaling assistance motor on an electric power-assisted bicycle equipped with a sensor measuring a force resultant on its crankset. This method comprises several steps. A first step a) consists in injecting, at a given instant, a continuous control current, of known value, into the motor to generate, in the motor, an assistance torque proportional to the injected current. A subsequent step b) consists in calculating the value of the assistance torque generated by the motor by applying, to the known value of the current, a first known proportionality coefficient of the structure of the motor. According to the invention, a third step c) consists in calculating a value of the longitudinal resultant of the assistance torque, on a predetermined axis set with respect to the frame of the bicycle, by applying a second proportionality coefficient to the value of the torque calculated in the step b), this second coefficient depending on the number of teeth of the chainring of the crankset engaged with the chain of the bicycle. Next, a step d) consists in measuring, using the sensor, a value of the longitudinal resultant, on the predetermined axis, of the total torque exerted on a shaft of the crankset and resulting from the torque exerted by the cyclist and from the assistance torque generated in the motor. Then, in a step e), a value of the longitudinal resultant, on the predetermined axis, of the torque exerted by the cyclist, is calculated as difference between the value measured in the step d) and the value calculated in the step c). A step f) consists in calculating an average value of the torque exerted by the cyclist over at least a fraction of a crankarm revolution by applying a third proportionality coefficient, which depends on the number of teeth of the chainring engaged with the chain, to the average of the variations of the value of the longitudinal resultant of the torque exerted by the cyclist over this fraction of a revolution. A step g) consists in calculating the value of the assistance torque to be generated in the motor by applying, to the average value calculated in the step f), a fourth proportionality coefficient selected as a function of the assistance mode planned for the bicycle. Next, a step h) consists in deducing, from the value of the assistance torque calculated in the step g), the value of the current to be injected into the motor at a subsequent instant. Finally, a step i) consists in determining the value of the second proportionality coefficient, as a function of the number of teeth of the chainring engaged with the chain, by implementing the following routines. A first of these routines i1) consists in implementing the steps a) to c) at a first given instant. Then, a routine i2) consists in, at a second given instant, suddenly varying the value of the current injected in the step a). A routine i3) consists in implementing the steps a) to c) again at the second given instant. Then, a routine i4) consists in calculating the difference between the values of the longitudinal resultant of the assistance torque obtained from the routines i1) and i3). Finally, a routine i5) consists in calculating a value of the second proportionality coefficient from the difference calculated in the routine i4).

Within the meaning of the present invention, the values obtained from the routines are values obtained in these routines or values calculated from the values obtained in these routines.

Within the meaning of the present invention, a longitudinal resultant of a force or of a torque on an axis is the longitudinal component of a resultant of this force or of this torque on this axis.

By virtue of the invention, the direct calculation of the second proportionality coefficient, which depends on the number of teeth of the chainring with which the chain is engaged, makes it possible to dispense with the measurement of the number of teeth and to use only the force sensor used to servocontrol the motor. Thus, the method is simple to implement and does not require the addition of an additional sensor, or of a second data acquisition and processing unit. The method is therefore more economical and more reliable that those of the prior art. Further, it is universal, since there is no need to add a sensor on the derailleur.

According to advantageous but non-mandatory aspects of the invention, such a method can incorporate one or more of the following features, taken according to any technically admissible combination:

during the routine i4), the values of the longitudinal resultant of the assistance torque used to calculate the difference are those respectively obtained in the routines i1) and i3);

during the step i4), the values of the longitudinal resultant of the assistance torque used to calculate the difference are, on the one hand, the average between a value of the longitudinal resultant of the assistance torque obtained in the routine i1) and another value of the longitudinal resultant obtained in another routine including the steps a) to c) and implemented at a third given instant after the variation of the current injected in the step a) and, on the other hand, the value of the longitudinal resultant of the assistance torque obtained in the routine i3);

the step of determination of the value of the second coefficient comprises an additional routine i6), implemented after the routine i5) and consisting in calculating the number of teeth of the chainring engaged with the chain;

during the additional routine, the calculated value of the number of teeth is compared to limit values of ranges of values and, if the calculated value is within a given range of values, the calculated value is adjusted to a predetermined value of the number of teeth;

following the adjustment of the calculated value to the predetermined value of the number of teeth, the second proportionality coefficient is determined again and, preferably, the third proportionality coefficient is determined again;

during the routine i2), a current value difference is applied to the value of the current used in the step a) of the routine i1);

the current value difference applied is positive or negative;

during the routine i2), the current value difference is applied during a predetermined period of a duration of between 20 and 500 ms, preferably between 50 and 200 ms, more preferably of the order of 100 ms;

the step of determination of the value of the second proportionality coefficient is implemented after detection of an abrupt variation of the longitudinal resultant of the total torque, of a speed of rotation of the motor or of a speed of rotation of the crankset;

the first given instant is chosen at a moment where the torque exerted by the cyclist varies little, notably when the crankarms of the crankset are in or close to their vertical position;

the predetermined and set axis according to which the value of the longitudinal resultant is calculated in the step c) is offset angularly, about the axis of rotation (Z) of the crankset and with respect to the longitudinal axis of the frame, by an angle of non-zero value.

According to another aspect, the invention relates to an electric power-assisted bicycle comprising a frame, a crankset and an assistance motor mounted on this frame. This bicycle is equipped with a control logic unit programmed to implement a control method as mentioned above.

The invention will be better understood and other advantages thereof will become more clearly apparent in light of the following description of two automatic methods for the current-mode control of a pedaling assistance motor on an electric power-assisted bicycle, given purely as an example and with reference to the drawings, in which.

Figure 1:
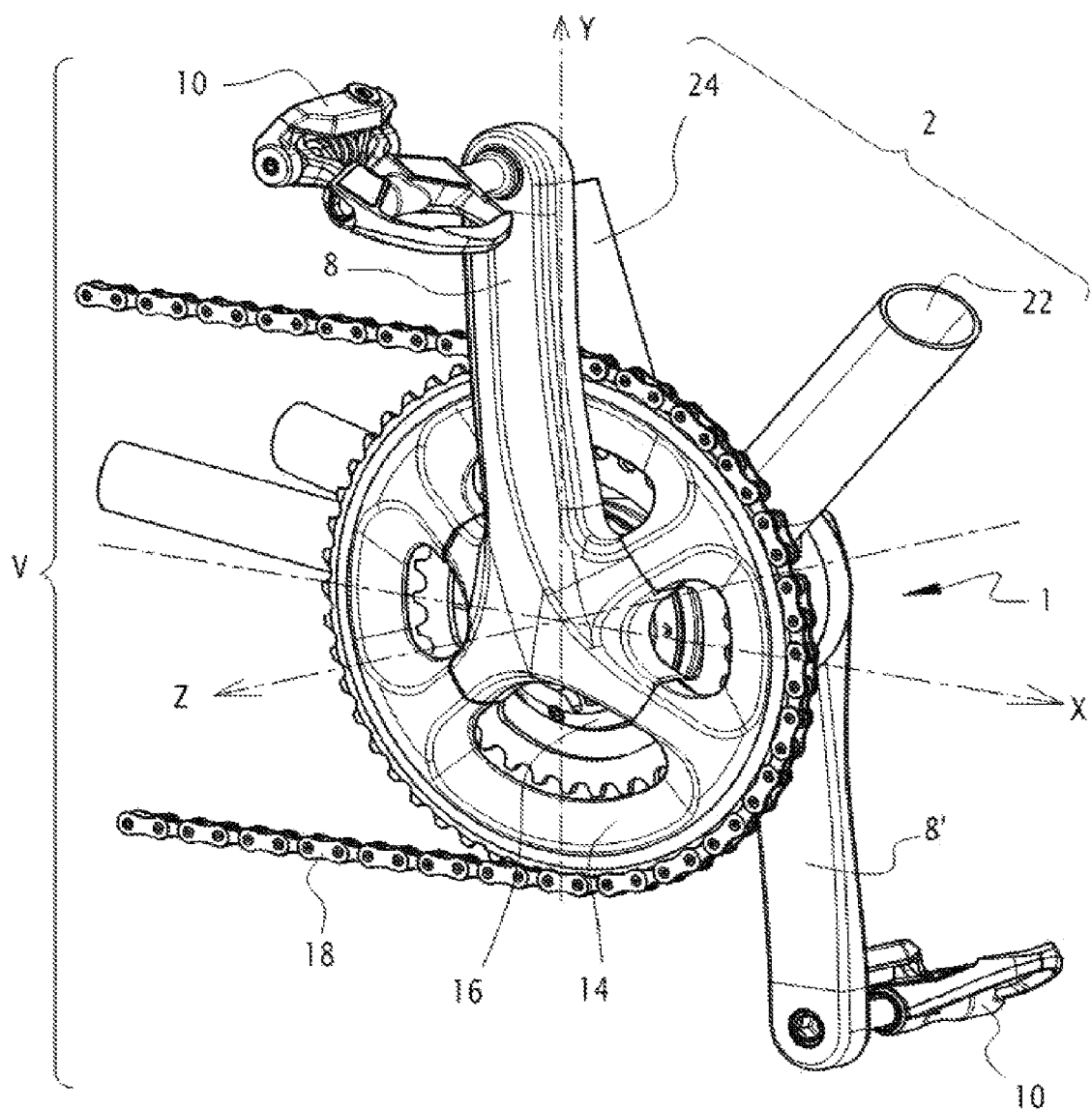
FIG. 1 is a perspective view of a crankset of an electric power-assisted bicycle according to the invention, which is partially represented in this figure.

FIG. 1 shows the crankset 1 of an electric power-assisted bicycle V. The crankset 1 is fixed to a frame 2 of the bicycle V. The frame 2 extends on a longitudinal axis X which defines the front-rear direction of the bicycle 2 when the latter moves in a straight line, this axis X being directed forward. This axis X is horizontal when the bicycle V is running on a flat ground. The frame 2 extends also heightwise on an axis Y directed upward. This axis Y is vertical when the bicycle V runs on a flat ground. An axis Z defines, with the axes X and Y, an orthogonal reference frame. The frame 2 comprises a bottom bracket 4 centered on the axis Z.

The crankset 1 comprises a hollow shaft 6, two crankarms 8 and 8' and two pedals 10. It is mounted on the frame 2 by engaging the shaft 6 in the bottom bracket 4.

Only an oblique tube 22 and a seat tube 24 of the frame 2 are visible in FIG. 1.

Figure 2:
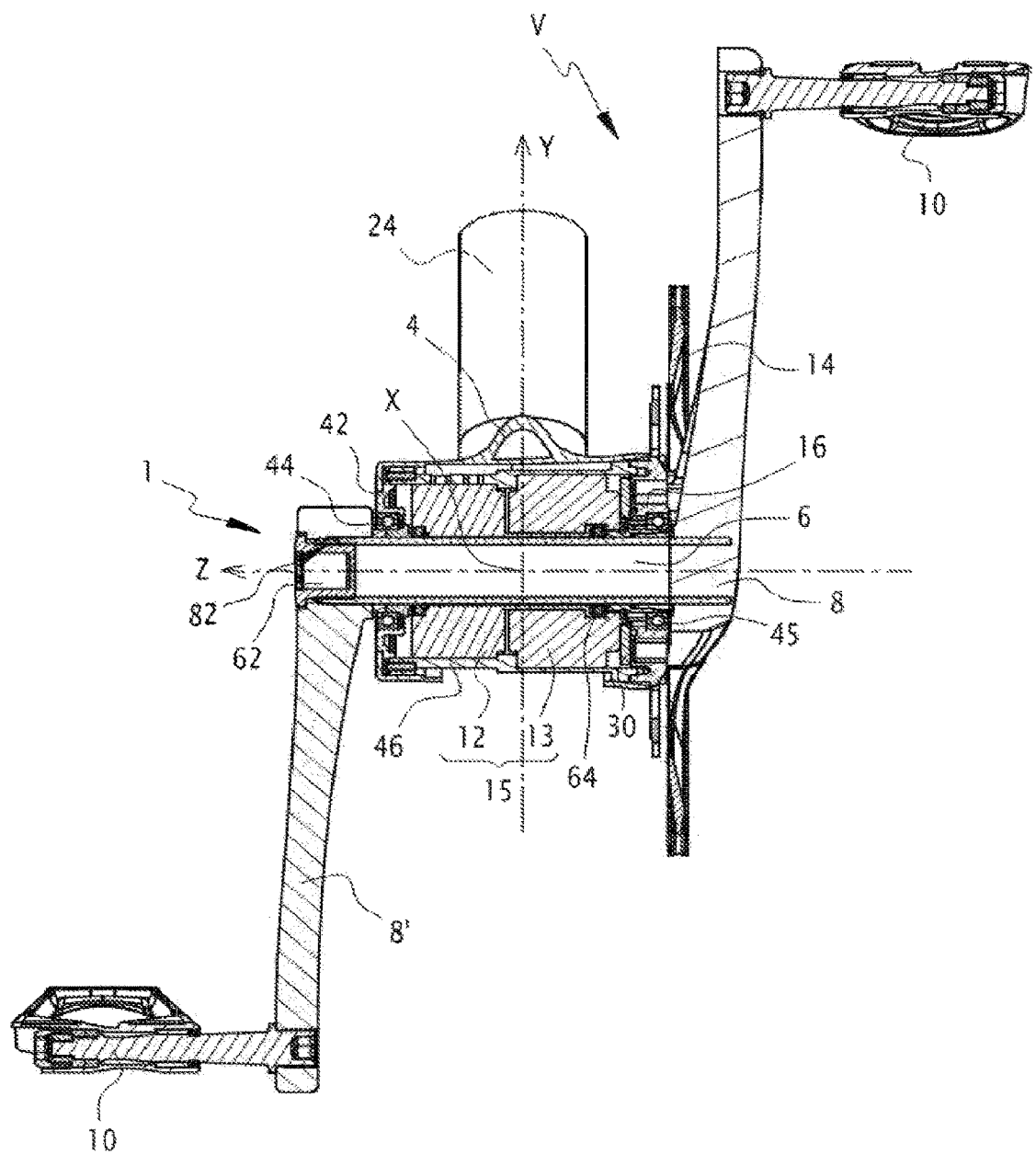
FIG. 2 is an axial cross section of the crankset of FIG. 1.

The electric power-assisted bicycle V also comprises two wheels, not represented in FIGS. 1 and 2, that are known per se. The rear wheel is a drive wheel, supported by the frame 2 and driven by a chain 18, the rectilinear strands of which are substantially parallel to the axis X and extend between the crankset 1 and one or more pinions secured in rotation to the rear wheel of the bicycle V, also not represented in the figures. The chain 18 is engaged with a toothed chainring 14, which belongs to the crankset 1 and which is secured in rotation to the shaft 6, which extends along the axis Z. The axis Z is therefore an axis of rotation of the crankset 1.

Figure 3:
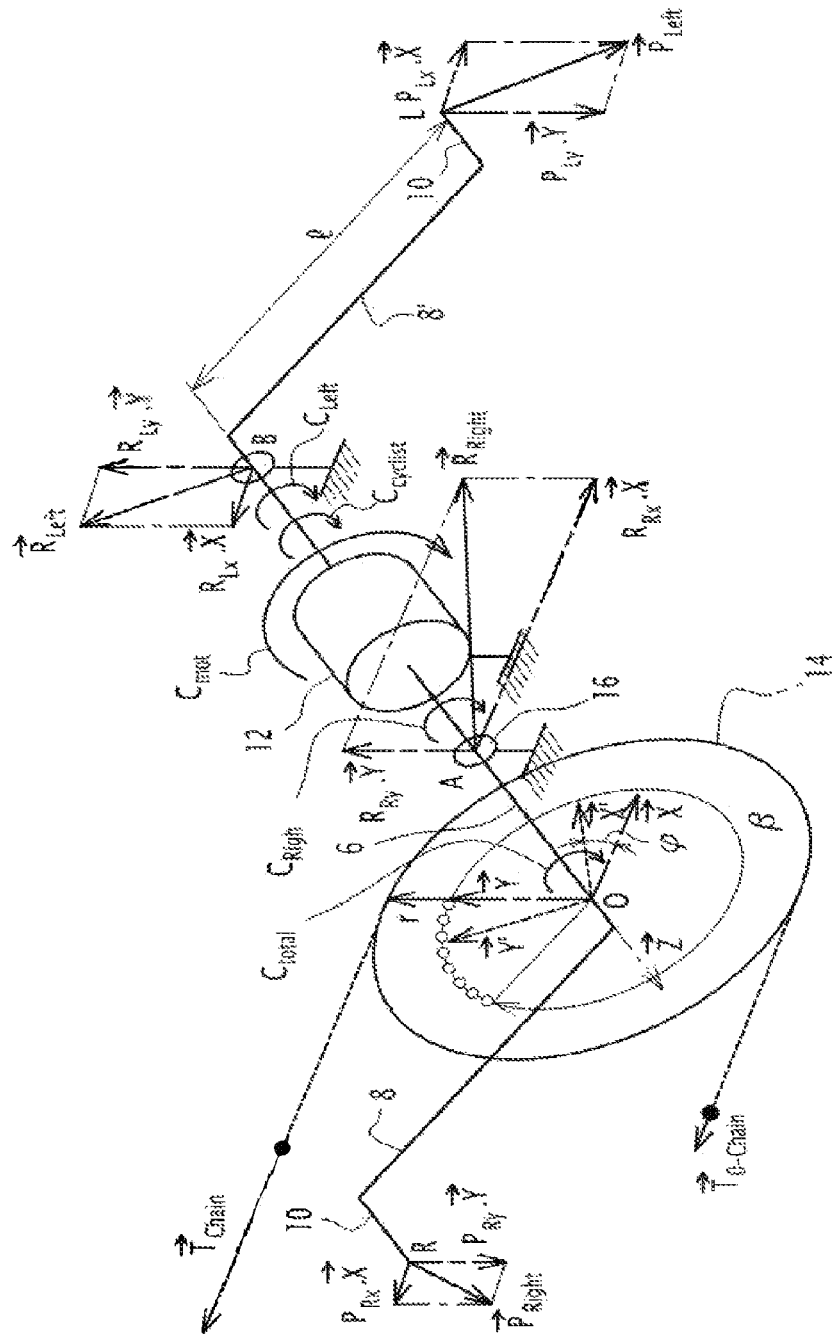
FIG. 3 is a kinematic diagram of the crankset of FIG. 1.

In practice, the crankset 1 comprises two chainrings 14, with different numbers of teeth, just one of these chainrings being represented in FIGS. 1 to 3, for clarity of the drawing. As a variant, the crankset 1 can comprise three or more chainrings.

The crankarms 8 and 8' are fixed to the shaft 6, extending radially to the axis Z and are located on either side of the bottom bracket 4 and the frame 2, along this axis Z. The pedals 10 are fixed orthogonally to the crankarms 8 and 8', that is to say that they are parallel to the axis Z, by being moved away from the frame 2, by known means which are not described in detail.

The chainring 14 is situated on the right side of the bottom bracket 4, that is to say between the right crankarm 8 and the bottom bracket 4, and is coaxial to the shaft 6 to which the crankarms 8 and 8' are fixed. The parts 6 and 14 are centered on and revolve about the axis Z.

The right crankarm 8 is secured to the shaft 6 which is, for example, shrinkfitted in this crankarm 8. The left crankarm 8' comprises a through orifice 82, in which the shaft 6 is inserted and held in place by a plug 62 screwed into the second end of the orifice 82.

The bottom bracket 4 is incorporated in the frame 2, for example welded to the tubes 22 and 24.

As can be seen in FIG. 2, the bottom bracket 4 is closed, at its left end, by a cover 42 which is fixedly mounted on the bottom bracket 4 and linked to the shaft 6 by means of a ball bearing 44.

The bottom bracket 4 is closed, at its right end, that is to say on the side of the chainring 14, by a sensor 16. The sensor 16 is fixedly mounted on the bottom bracket 4 and linked to the shaft 6 by means of a ball bearing 45. The ball bearings 44 and 45 allow the shaft 6 to have a rotational movement inside the bottom bracket to form a pivot link therewith.

The bottom bracket 4 comprises a casing 46 inside which there are a motor 12 and a gear 13. The motor 12 is an electric power assistance motor of the bicycle V. It serves to provide an assistance torque $C_{mot}$, which assists the user in the pedaling. This torque, just like all the other torques mentioned below, is expressed in newton meters (Nm).

The motor 12 is, for example, an electric motor whose mechanical torque $C_{mot}$ generated at the output is proportional to an input courant It, such as, for example, a direct current motor with brushes, in which the switching of the phases is given by a commutator with brushes. It can also be a contactless multiphase motor, in which the switching of the phases is managed by a controller and of which the torque characteristic is proportional to the current setpoint applied to the input of the controller. In practice, such a motor is known by the acronym BLDC (for "brushless direct current").

The motor 12 generates a mechanical torque which is amplified by the gear 13. This torque is then transferred from the gear 13 to the shaft 6 via a freewheel mechanism 64. The elements 12 and 13 form, together, a pedaling assistance gear motor 15 on the bicycle V.

The kinematic diagram of FIG. 3 summarizes the equilibrium of the forces which are exerted on the crankset 1. The cyclist exerts, on the left crankarm 8', a force $P_{Left}$, and on the right crankarm 8, a force $P_{right}$, both directed toward the ground. These forces are transmitted by the corresponding crankarms 8 and 8' to the shaft 6, on which they exert, together, a rotational torque $C_{cyclist}$, about the axis Z, which is the sum of a torque $C_{Left}$ resulting from the force $P_{Left}$ and of a torque $C_{Right}$ resulting from the force $P_{Right}$.

The assistance motor 12 exerts, through the gear 13, the assistance torque $C_{mot}$ on the axis 6. In FIG. 3, the gear motor 15 is represented as a whole.

In this FIG. 3, the resultants of the force exerted by the frame 2 on the shaft 6 on the left and right sides of the frame 2 are respectively denoted $R_{Left}$ and $R_{Right}$.

Each of the forces P and R mentioned above are broken down into a longitudinal component and a vertical component. The longitudinal component is parallel to the axis X and identified with the notation $\vec{X}$. The vertical component is parallel to the axis Y and identified with the notation $\vec{Y}$.

Hereinbelow, in order to simplify the description, it is considered that the resultant of each of the forces $P_{Right}$ and $P_{Left}$ is oriented mainly vertically, such that it is possible to disregard the horizontal components $P_{RX}$ and $P_{LX}$, which are oriented on the axis X. Thus, the longitudinal component of the radial force $R_{Right}$ exerted by the bearing 45 on the shaft 6 of the crankset 1 is primarily generated by the effect of the tension $T_{chain}$ of the chain 18.

The sensor 16 is a force sensor which measures a longitudinal component $R_{Rx}$ Total of a total resultant, on the axis X, that is to say, a longitudinal resultant on this axis, of the radial force generated by the drive action, of the cyclist and of the assistance, on the right side of the crankset, at the bearing 45. This resultant is expressed in newtons (N). The sensor 16 is known per se. It can, for example, be of the type of that described in U.S. Pat. No. 8,117,923.

The sum of the torque $C_{cyclist}$ supplied by the cyclist and of the assistance torque $C_{mot}$ supplied by the motor 12 is a total torque $C_{Total}$ which induces a rotation of the chainring 14. Since the chain 18 is engaged with the teeth of the chainring 14, it is tightened when the chainring 14 revolves. The tension $T_{chain}$ of the chain 18 is proportional to the torque $C_{Total}$ and inversely proportional to a number of teeth $N_t$ of the chainring 14. The longitudinal resultant $R_{Rx}$ Total measured by the sensor varies substantially proportionally to the tension $T_{chain}$ of the chain 18. The total longitudinal resultant $R_{Rx}$ Total is the superimposition of the action of the cyclist $R_{Rx}$Cyclist and of the action of the assistance $R_{Rx}$assist:

$$R_{Rx}\text{Total} = R_{Rx}\text{Cyclist} + R_{Rx}\text{assist}$$

in which $R_{Rx}$cyclist is a value of the longitudinal resultant generated by the torque $C_{cyclist}$ supplied by the cyclist on the axis X and $R_{Rx}$assist is a value of the longitudinal resultant generated by the assistance torque $C_{mot}$ of the bicycle on the axis X.

Figure 4:
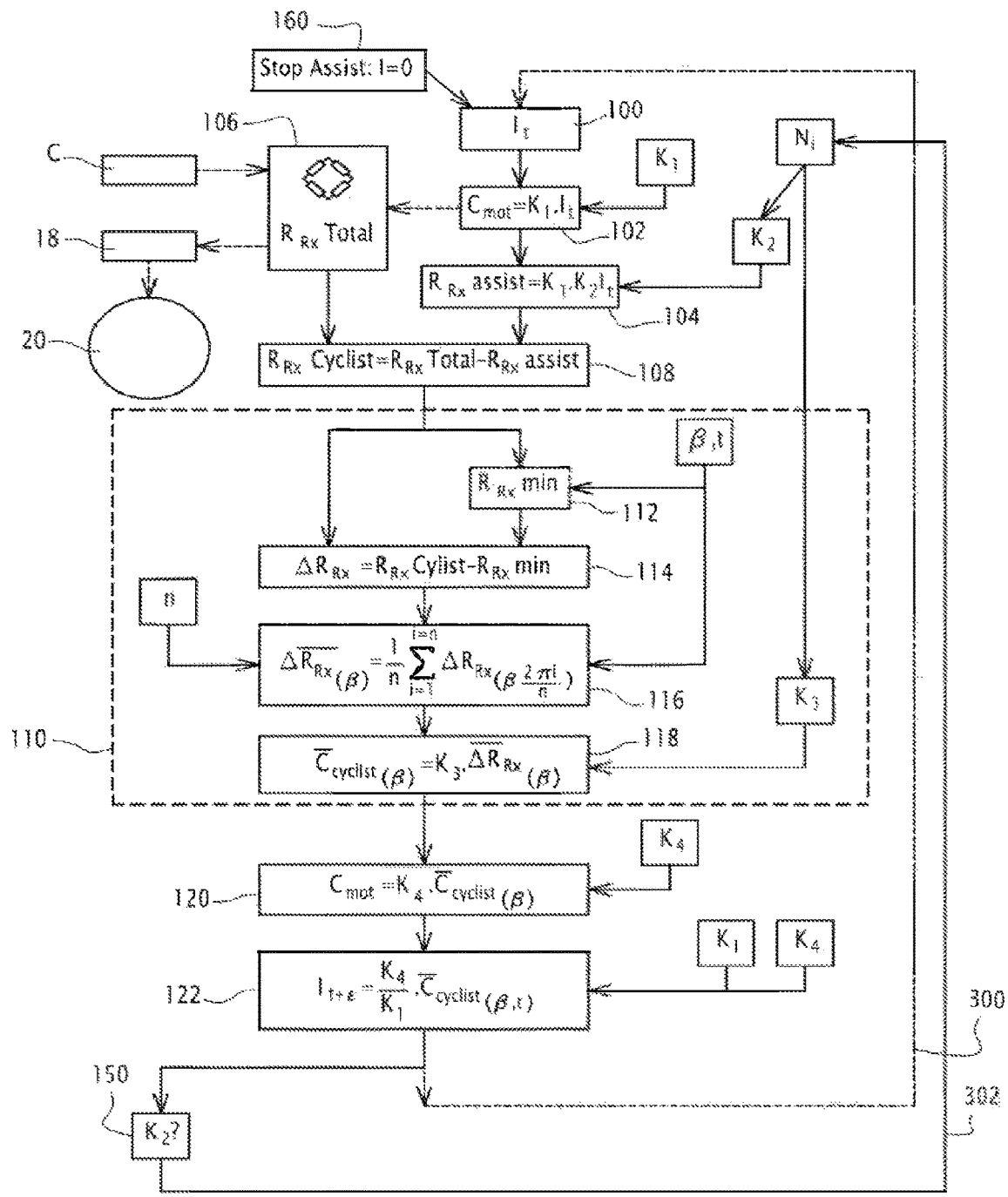
FIG. 4 is a block diagram of an automatic method, according to the invention, for the current-mode control of the pedaling assistance motor of the electric power-assisted bicycle of FIGS. 1 and 2.

FIG. 4 presents a servocontrol method for the motor 12, according to the invention, that makes it possible to generate the assistance torque $C_{mot}$ necessary to the cyclist, as a function of the torque $C_{cyclist}$ that he or she exerts on the shaft 6.

This method is implemented by means of a control logic unit 30, which is formed by an electronic circuit board equipped with at least a processor and a memory in which are stored instructions that can be executed by the microprocessor. In practice, the electronic logic unit 30 takes the form of a printed circuit board housed in the bottom bracket 4 and which supports electronic components, including at least the microprocessor and a memory, programmed to implement this method.

As a variant, the electronic logic unit 30 can be mounted on the bicycle elsewhere than in the bottom bracket 4, for example as part of the output power management board of the battery powering the motor 12 or in the interface of the cyclist, which can be situated on the handlebar.

In FIG. 4, the reference C represents the cyclist, the reference 18 represents the chain and the reference 20 represents the rear wheel of the bicycle V. The other references beginning with 1 represent steps of the control method of the invention.

In a first step 100, at a given instant t, a continuous control current of known value It is injected into the motor 12 to generate, in the motor 12, an assistance torque proportional to the injected current $I_t$.

Next, in a step 102, the value of the assistance torque $C_{mot}$ to be supplied is calculated. This value is proportional to the current $I_t$, with a first proportionality coefficient $K_1$, called "motor constant", which depends on the structure of the motor 12 and on its gear 13 and which is assumed known. In practice, this coefficient $K_1$, which can be expressed in newton-meters per ampere ($NmA^{-1}$), is supplied by the manufacturer of the gear motor 15.

For the calculation of the step 102, the following relationship is applied:

$$C_{mot} = K_1 \cdot I_t$$

Then, in a step 104, a value of the longitudinal resultant $R_{Rx}$assist generated by the assistance torque $C_{mot}$ on the axis X is calculated. The value of $R_{Rx}$ assist is proportional to the assistance torque $C_{mot}$ and to a second proportionality coefficient $K_2$, which can be expressed in $m^{-1}$. The coefficient $K_2$ is inversely proportional to the number of teeth $N_i$ of the chainring 14 engaged with the chain 18.

For the calculation of the step 104, the following relationship is applied:

$$R_{RX}\text{assist}=K_1 \cdot K_2 \cdot I_t$$

Next, in a step 106, the sensor 16 measures the longitudinal resultant $R_{Rx}$Total of the total torque $C_{Total}$.

Then, in a step 108, a value of a longitudinal resultant $R_{Rx}$Cyclist, on the axis X, of the torque $C_{cyclist}$ exerted by the cyclist, is deduced by subtracting, from the value of the measured longitudinal resultant $R_{Rx}$Total, the value of the longitudinal resultant $R_{Rx}$assist calculated in step 104.

For the calculation of the step 108, the following relationship is applied:

$$R_{RX}\text{Cyclist}=R_{RX}\text{Total}-R_{RX}\text{assist}$$

Thus, the longitudinal component, that is to say parallel to the axis X, of the force exerted by the cyclist is known and the necessary assistance torque can be deduced therefrom.

In a step 110, an average value of the torque $C_{cyclist}$ exerted by the cyclist over a revolution of crankarms 8 and 8' is calculated.

The step 110 is subdivided into several substeps. First of all, in a substep 112, a minimum resultant value $R_{Rx}$min on the axis X exerted by the cyclist is determined, as a function of an angle $\beta$ of the crankarm 8 or 8' with respect to the axis Y. This minimum value is determined at an instant t for a number n of different angles $\beta$, with n an integer number strictly greater than 2. In practice, the value of n is chosen to be greater than 8, preferably of the order of 60.

Next, in a substep 114, a differential value $\Delta R_{Rx}$ between the value of the longitudinal resultant $R_{Rx}$Cyclist and the minimum value $R_{Rx}$min of the longitudinal resultant exerted by the cyclist is calculated. This differential measurement makes it possible to dispense with measurement offsets that can be linked to the temperature variations and to the calibration of the sensor 16. This differential measurement also makes it possible to avoid untimely assistance, potentially dangerous for the user, in the case where the sensor 16 might detect a signal representative of the abnormally constant torque potentially due for example to mechanical friction or to an electrical connection fault that may saturate the sensor.

In a substep 116, the microprocessor calculates an average value $$\overline{\Delta R_{Rx(\beta)}}$$

of the variations of the value of the longitudinal resultant $R_{Rx}$Cyclist over this revolution, using the formula below:

$$\overline{\Delta R_{Rx(\beta)}} = \frac{1}{n}\sum_{i=1}^{n} \Delta R_{Rx_{\left(\beta\frac{2\pi i}{n}\right)}}$$

In this formula, i is an integer less than n and the average value $$\overline{\Delta R_{Rx(\beta)}}$$

is calculated by taking account of the difference $\Delta R_{Rx}$ at n different angles.

The fact of calculating an average value for a revolution for the value of the difference in values makes it possible to smooth this value over a revolution.

Finally, in a substep 118, the average value $$\overline{\Delta R_{Rx(\beta)}}$$

is multiplied by a third proportionality coefficient $K_3$, which is expressed in meters and which depends on the number of teeth $N_i$ of the chainring 14. In practice, this coefficient $K_3$ increases with the number of teeth $N_i$ of the chainring 14. This makes it possible to know the average value of the torque $C_{cyclist}$ exerted by the cyclist by using the following relationship:

$$C_{cyclist(\beta)}=K_3 \cdot \overline{\Delta R}_{Rx(\beta)}$$

Once the step 110 has been performed, the assistance torque $C_{mot}$ to be generated at the instant t+$\varepsilon$ following the instant t is calculated, in a step 120, by applying, to the average value of the torque $C_{cyclist}$ exerted by the cyclist, a fourth proportionality coefficient $K_4$, unitless, which depends on the assistance mode selected by the user. The assistance mode varies the proportion of the torque from the cyclist $C_{cyclist}$ which will be supplied by the motor 12.

This assistance mode varies generally between a mode No. 1 (little assistance, mainly to compensate for the weight of the bicycle V), and a mode No. 4 (maximum assistance, to assist the cyclist as much as possible). For example, the assistance mode No. 1 can correspond to a coefficient $K_4$ equal to 0.2. Thus, the torque $C_{mot}$ supplied by the motor 12 corresponds to 20% of the torque $C_{cyclist}$ supplied by the cyclist. The assistance mode No. 2 can, for example, correspond to a coefficient $K_4$ equal to 0.5. Thus, the torque $C_{mot}$ supplied by the motor 12 corresponds to 50% of the torque $C_{cyclist}$ supplied by the cyclist. The assistance mode No. 3 can, for example, correspond to a coefficient $K_4$ equal to 1. Thus, the torque $C_{mot}$ supplied by the motor 12 corresponds to 100% of the torque $C_{cyclist}$ supplied by the cyclist. The assistance mode No. 4 can, for example, correspond to a coefficient $K_4$ equal to 2. Thus, the torque $C_{mot}$ supplied by the motor 12 corresponds to 200% of the torque $C_{cyclist}$ supplied by the cyclist.

Thus, the assistance torque $C_{mot}$ supplied by the motor is proportional to the average value of the torque $C_{cyclist}$ exerted by the cyclist, with the coefficient $K_4$ as proportionality coefficient. This proportionality remains as a maximum torque of the gear motor 15 which is not yet reached. Next, the torque saturates at its maximum value.

Next, in a step 122, the current $I_{t+\varepsilon}$ to be injected at the instant t+$\varepsilon$ is deduced by dividing the torque $C_{mot}$ to be injected, calculated in the step 120, by the constant $K_1$ of the motor 12.

If no change of chainring 14 has been detected, the current $I_{t+\varepsilon}$ is injected into the motor 12, as represented by the dotted-line arrow 300 on the right of FIG. 4 and the servocontrol loop resumes at the step 100.

At any moment, the method of FIG. 4 can be interrupted by a step 160 during which the value of the current I is set to zero, notably for safety reasons.

Figure 5:
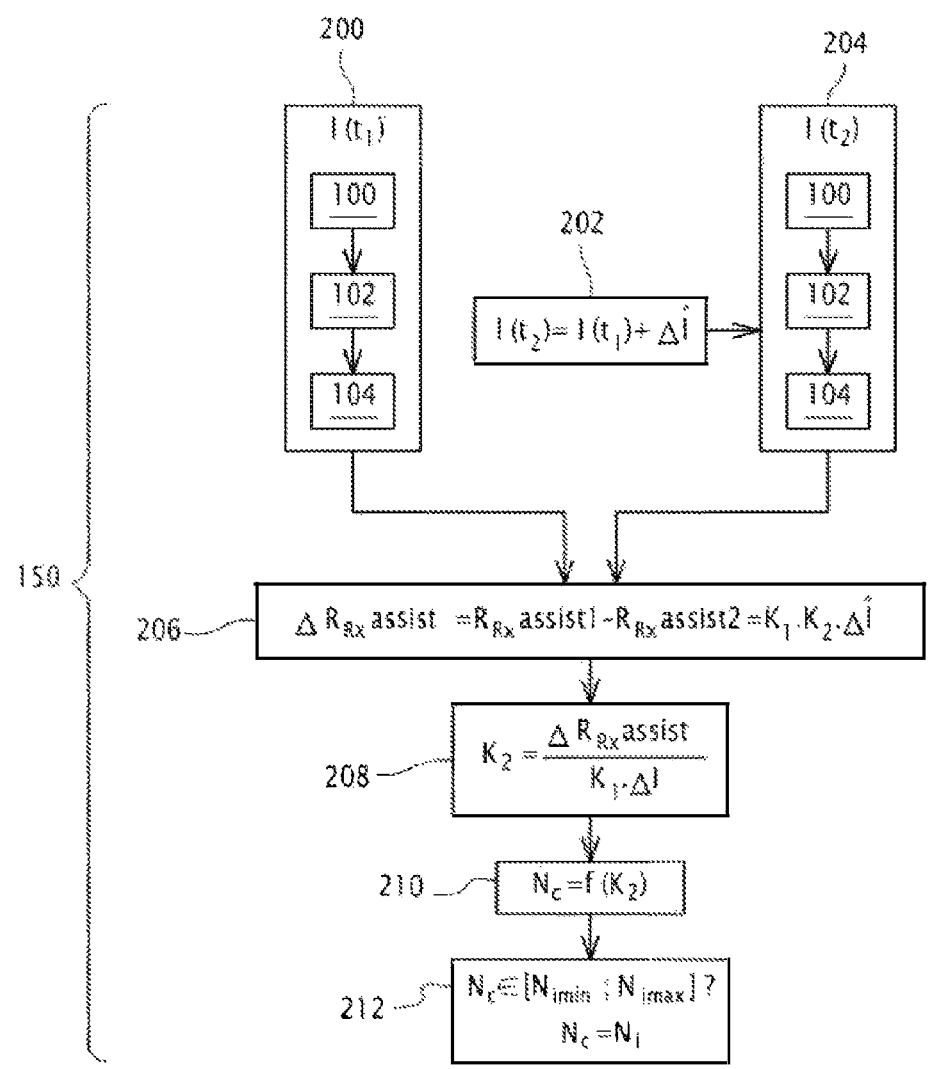
FIG. 5 is a detailed block diagram of the step 150 of FIG. 4.

If a change of chainring 14 has been detected, for example if an abrupt variation of the torque $C_{Total}$ is detected by the sensor 16, before returning to the step 100, a step 150 of automatic determination of the number of teeth of the chainring 14 with which the chain 18 is engaged is performed. For this, the value of the second proportionality coefficient $K_2$ must be determined. Routines implemented in this step 150, in the first embodiment of the invention, are detailed in FIG. 5.

Initially, in a routine 200, the steps 100, 102 and 104 are implemented at a given first instant $t_1$ with a first current $I(t_1)$ injected into the motor 12. This first current $I(t_1)$ is equal to the current $I_{t+\varepsilon}$ calculated in the preceding step 122.

Next, in a routine 202, a new current value $I(t_2)$ to be injected at a given instant $t_2$ after the instant $t_1$ is calculated by adding to the value $I(t_1)$ a current difference $\Delta I$, positive or negative, such that the curve of current with respect to time forms a level and the intensity of the current supplied to the motor 12 and the torque $C_{mot}$ supplied by this motor vary abruptly.

In practice, the instant $t_2$ immediately follows the instant $t_1$, with a time difference between them of less than 500 ms, preferably less than 10 ms.

The value of the current difference $\Delta I$ must be sufficient to induce a significant variation of the value of the torque $C_{mot}$ supplied by the motor 12, but not too high not to be detected by the user. For example, the current difference $\Delta I$ is between 1 and 5 A, preferably equal to 3 A.

Then, in a routine 204, performed at the given instant $t_2$, the steps 100, 102 and 104 are implemented again, this time with the new current value $I(t_2)$.

Thus, in the case where the current difference $\Delta I$ is positive, the value $C_{mot}(t_2)$ of the motor torque at the instant $t_2$ is greater than the value $C_{mot}(t_1)$ of the motor torque at the instant $t_1$.

Likewise, in the case where the current difference $\Delta I$ is negative, the value $C_{mot}(t_2)$ is less than the value $C_{mot}(t_1)$.

Since the values of the longitudinal resultants $R_{Rx}$assist1 and $R_{Rx}$assist2 of the torques $C_{mot}(t_1)$ and $C_{mot}(t_2)$ on the axis X are known from the steps 104 implemented in the routines 200 and 204, it is easy to calculate, in a routine 206, their difference $\Delta R_{Rx}$assist which follows the following relationship:

$$\Delta R_{Rx}\text{assist} = R_{Rx}\text{assist1} - R_{Rx}\text{assist2} = K_1 K_2 \Delta I$$

Next, in a routine 208, the value of the second proportionality coefficient $K_2$ is deduced from the preceding relationship, since it is the only unknown of the relationship.

The number of teeth $N_i$ of each chainring 14 engaged with the chain 18 depends on the coefficient $K_2$, so it can therefore be calculated, in an optional routine 210, from the value of $K_2$ determined in the step 208. The calculated value of the number of teeth is denoted $N_C$.

The exact number of teeth $N_i$ of each chainring 14 is set and depends on the primitive diameter of said chainring.

The value of $N_C$ calculated in the step 210 is an approximate value. In order to have servocontrol that is the most accurate possible, it is therefore preferable to rectify this number of teeth $N_C$ by approximating it for example to the nearest integer, since the number of teeth $N_i$ is necessarily integer.

For this, the electronic logic unit 30 collects the data collected by the sensor 16.

Since there are a limited number of possible chainring 14 diameters, the control system has a table in which the various possible predetermined values of $N_i$ are stored, as well as, for each of them, limit values of ranges of values, including a minimum value $N_{i\ min}$ and a maximum value $N_{i\ max}$ forming a range of values centered on the value $N_i$. The calculated value $N_C$ is compared to the values stored in the table. Next, if it is within one of the ranges of values, this calculated value $N_C$ is adjusted to be made equal to the nearest $N_i$ value for which it falls within the range. This occurs in the context of a final routine 212 of the step 150.

Figure 6:
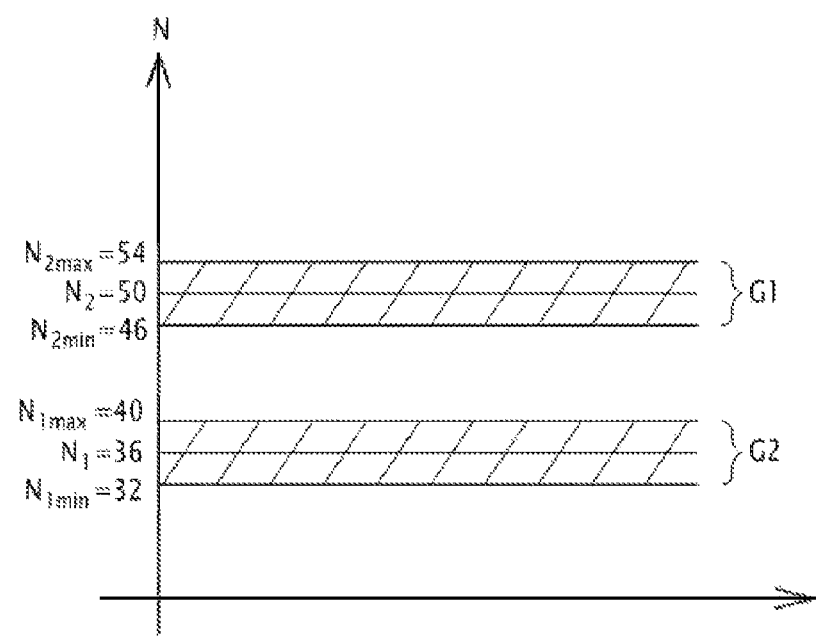
FIG. 6 is a schematic representation of the values of the number of teeth of the chainrings of a crankset of the bicycle of FIG. 1.

In the example represented in FIG. 6, the crankset comprises two chainrings, which is a conventional case, and two values of number of teeth $N_i$ are possible, namely $N_1=36$ and $N_2=50$. Two possible ranges G1 and G2 of calculated values $N_C$ that can correspond to these numbers of teeth are considered. The first range G1 lies between $N_{1\ min}=32$ and $N_{1\ max}=40$ and the second range G2 lies between $N_{2\ min}=46$ and $N_{2\ max}=54$.

If the calculated value $N_C$ is in one of the ranges G1 and G2, then this value is automatically recentered, in the routine 212, on the $N_1$ or $N_2$ center value of this range, namely 36 or 50 teeth depending on the case. In this case, the value $N_1$ or $N_2$ is injected as an input parameter of the method of FIG. 4, as represented by the arrow 302 in this figure.

Otherwise, the calculation for determining the number of teeth is considered unfruitful and the step 150 is restarted.

It should be noted that the ranges G1 and G2 of the different $N_1$ values do not overlap, that is to say that, for a first number of teeth N, and a second number of teeth $N_2$, greater than $N_1$, $N_{1\ max}$ is always strictly less than $N_{2\ min}$.

Following the adjustment of the calculated value $N_C$ of the number of teeth to one of the predetermined values $N_i$ of the number of teeth, the second proportionality coefficient $K_2$ and, preferably, the third proportionality coefficient $K_3$, are recalculated or determined from a table stored in the memory of the logic unit 30.

Once this calculation or this determination is done, the value of the injected current returns to the value that it had before the step 150, that is to say to $I_{t+\varepsilon}$.

It should be noted that the time for which the current difference $\Delta I$ is assigned to $I(t_1)$ is short, such that the cyclist does not feel the torque variation $C_{mot}$ supplied by the motor. Thus, the time of application of the current difference $\Delta I$ lies between 20 and 500 ms, preferably between 50 and 200 ms, more preferably of the order of 100 ms.

Furthermore, for the comfort of the cyclist and his or her safety, it is preferable for the measurement to be made when one of the pedals 10 is at top dead center and the other is at bottom dead center, such that the torque $C_{cyclist}$ exerted by the cyclist is virtually constant and close to its minimum, that is to say that it is preferable to choose the first given instant $t_1$ when the torque exerted by the cyclist varies little, notably when the crankarms 8 and 8' are in, or close to, their vertical position orthogonal to the axes X and Z.

The steps 100 to 150 and the routines 200 to 212 are performed automatically by the logic unit 30, without intervention from the cyclist.

In practice, as envisaged above, the step 150 can be implemented each time a change of chainring 14 is detected. The detection of the change of chainring 14 is performed by detecting an abrupt variation of the value of the longitudinal resultant $R_{Rx}$Total, an abrupt variation of the speed of the motor 12 or an abrupt variation of the speed of the crankset 1, for example when this variation is equal to or greater than 30%.

Figure 7:
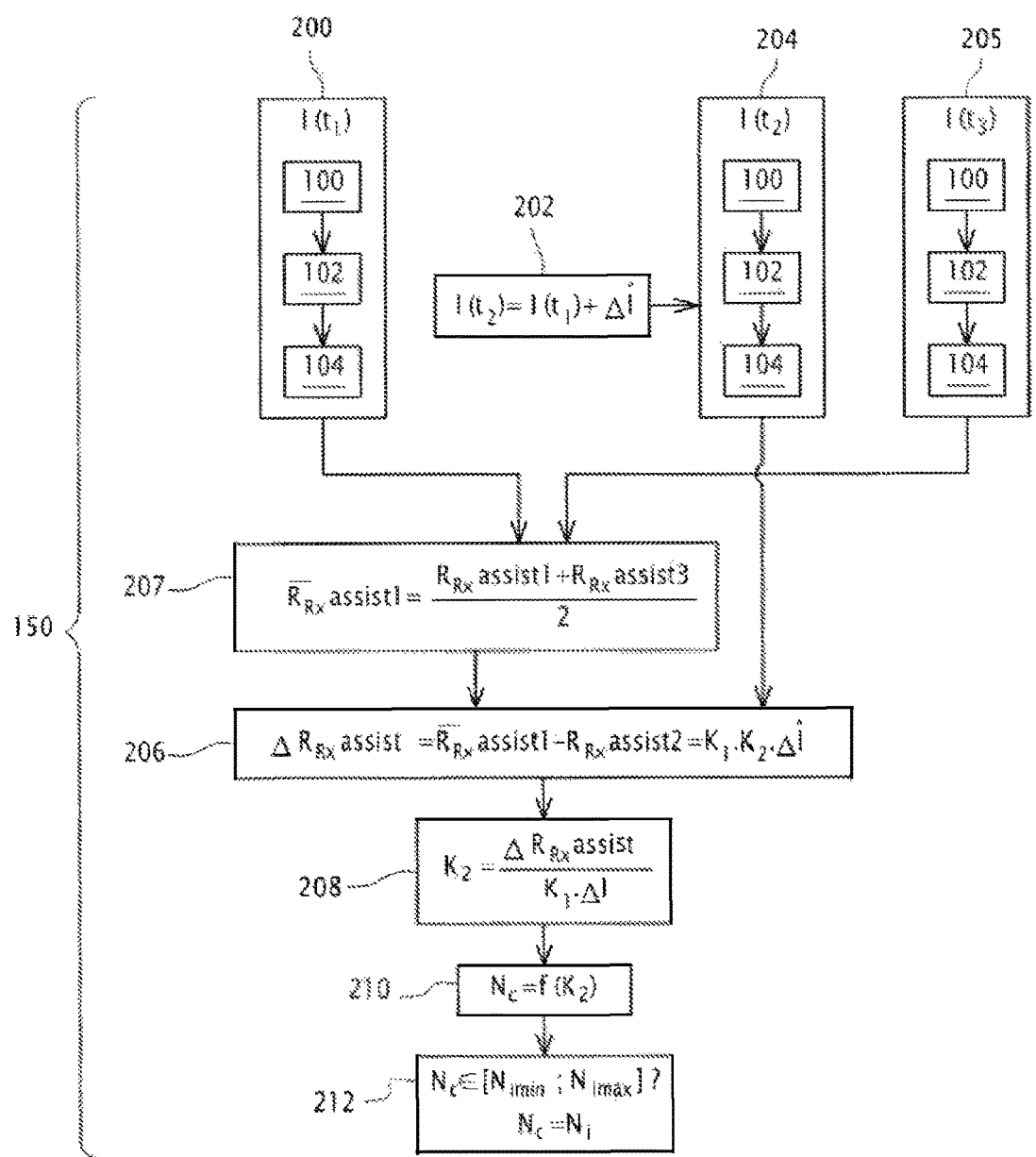
FIG. 7 is a block diagram of a second method according to the invention.

FIG. 7 details the routines implemented in the step 150 of a second embodiment of the invention.

Initially, the routines 200, 202 and 204 are implemented in the same way as in the first embodiment.

Next, in an additional routine 205 performed at a third given instant $t_3$, the steps 100, 102 and 104 are implemented with a current $I(t_3)$, which is equal to the current $I_{t+\varepsilon}$, calculated in the step 122.

The instant $t_3$ comes after the application of the current difference $\Delta I$, therefore in the step 202. In practice, the instant $t_3$ rapidly follows the instant $t_2$, with a time difference between them of less than 1 second, preferably less than 500 ms, more preferably of the order of 20 ms.

Then in a new step 207, an average $R^-_{Rx}\text{assist1}$ of the value of the longitudinal resultant $R_{Rx}\text{assist1}$ of the assistance torque $C_{mot}$ obtained in the routine 200 and of the value of the longitudinal resultant $R_{Rx}\text{assist3}$ of the assistance torque $C_{mot}$ obtained in the routine 205 is calculated:

$$R^-_{Rx}\text{assist1} = \frac{R_{Rx}\text{assist1} + R_{Rx}\text{assist3}}{2}$$

Next, in the step 206, a difference $\Delta R_{Rx}\text{assist}$ between the average $R^-_{Rx}\text{assist1}$ and the value of the longitudinal resultant $R_{Rx}\text{assist2}$ of the assistance torque $C_{mot}$ calculated in the routine 204 is determined with the following relationship:

$$\Delta R_{Rx}\text{assist}=R^-_{Rx}\text{assist1}-R_{Rx}\text{assist2}=K_1 K_2 \Delta I$$

Finally, the routines 208 to 212 are implemented in the same way as in the first embodiment.

The variants mentioned below apply to the two embodiments.

In a variant, the automatic determination of the number of teeth $N_i$ can be made on each iteration of the method for servocontrolling the motor 12.

In a variant, the calculation of the average value of the torque exerted by the cyclist $C_{cyclist}$ can be calculated over a fraction of revolution, notably over a half revolution, over several half-revolutions or over several revolutions of crankarms 8 and 8'.

In a variant, the axis according to which the measurement longitudinal component is considered can advantageously be offset angularly with respect to the axis X, by a non-zero angle φ, preferably lying between 15° and 20°, about the axis Z. This is represented by the axes X' and Y' in FIG. 3 and improves the detection accuracy of the sensor 16 by notably taking into account the effect of the longitudinal components $P_{RX}$ and $P_{LX}$, which was disregarded in the interests of simplification at the start of this description.

In a variant, the step 150 does not comprise the routines 210 and 212 and the coefficient calculated in the routine 208 is directly used in the step 104. The value of the coefficient $K_3$ can then be adjusted as a function of that of coefficient $K_2$.

In a variant, the gear 13 can be omitted.

In a variant, the sensor 16 can be positioned on the left of the frame 2, at the ball bearing 44. In this case, the calculations presented above are made by considering, in the torque $C_{cyclist}$ exerted by the cyclist, only the torque $C_{Left}$ exerted by pressing on the left pedal 10.

In another variant, a first sensor 16 is positioned on the left of the frame 2, at the bearing 44 and a second sensor 16 is positioned on the right of the frame 2, at the ball bearing 45. In this case, the calculations presented above are made by considering, in the torque $C_{cyclist}$ the sum of the torque $C_{Right}$, exerted by the cyclist by pressing on the right pedal 10, and of the torque $C_{Left}$, exerted by the cyclist by pressing on the left pedal 10.

The embodiments and the variants mentioned above can be combined with one another to generate new embodiments of the invention.

The invention claimed is:

1. An automatic method for current-mode control of a pedaling-assisted motor on an electric power-assisted bicycle equipped with a sensor configured to measure a resultant force on a crankset of the bicycle, the method comprising:

a) injecting, at a given instant (t), a continuous control current of known value into the motor to generate, in the motor, an assistance torque proportional to the injected current;

b) calculating a value of the assistance torque generated by the motor by applying, to a known value of the current, a first known proportionality coefficient of a structure of the motor:

c) calculating a value of a longitudinal resultant of the assistance torque, on a predetermined axis (X; X') set with respect to a frame of the bicycle, by applying a second proportionality coefficient to the value of the assistance torque calculated in step b), the second proportionality coefficient depending on a number of teeth of a chainring of the crankset engaged with a chain of the bicycle;

d) measuring, using the sensor, a value of the longitudinal resultant on the predetermined axis (X; X'), of a total torque exerted on a shaft of the crankset and resulting from a torque exerted by a cyclist and from the assistance torque generated in the motor;

e) calculating a value of the longitudinal resultant, on the predetermined axis (X; X'), of the torque exerted by the cyclist, as a difference between the value measured in step d) and the value calculated in step c):

f) calculating an average value of the torque exerted by the cyclist over at least a fraction of a revolution of a crankarm by applying a third proportionality coefficient, which depends on the number of teeth of the chainring engaged with the chain, to an average of variations of the value of the longitudinal resultant of the torque exerted by the cyclist over the fraction of the revolution;

g) calculating a value of the assistance torque to be generated in the motor by applying to the average value calculated in step f) a fourth proportionality coefficient selected as a function of an assistance mode planned for the bicycle;

h) deducing, from the value of the assistance torque calculated in step g), a value of the current to be injected into the motor at a subsequent instant (t+ε); and i) determining the value of the second proportionality coefficient, as a function of the number of teeth of the chainring engaged with the chain, by implementing at least the following routines:

i1) implementing steps a) to c) at a first given instant ($t_1$), i2) at a second given instant ($t_2$), suddenly varying the value of the current injected in step a), i3) implementing steps a) to c) again at the second given instant ($t_2$), i4) calculating a difference between the values of the longitudinal resultant of the assistance torque obtained from the routines i1) and i3), and i5) calculating a value of the second proportionality coefficient from the difference calculated in the routine i4).

2. The method according to claim 1, wherein, during the routine i4), the values of the longitudinal resultant of the assistance torque used to calculate the difference are those respectively obtained in the routines i1) and i3).

3. The method according to claim 1, wherein, during the step i4), the values of the longitudinal resultant of the assistance torque used to calculate the difference are, first, an average between a value of the longitudinal resultant of the assistance torque obtained in the routine i1) and another value of the longitudinal resultant obtained in another routine including the steps a) to c) and implemented at a third given instant ($t_3$) after a variation of the current injected in the step a), and, second, the value of the longitudinal resultant of the assistance torque obtained in the routine i3).

4. The method according to claim 1, wherein the step i) of determining the value of the second coefficient comprises an additional routine, implemented after the routine i5), of i6) calculating the number of teeth of the chainring engaged with the chain.

5. The method according to claim 4, wherein, during the additional routine, the calculated value of the number of teeth is compared to limit values of ranges of values and, if the calculated value is within a given range of values, the calculated value is adjusted to a predetermined value of the number of teeth.

6. The method according to claim 5 wherein, following an adjustment of the calculated value to the predetermined value of the number of teeth, the second proportionality coefficient is determined again.

7. The method according to claim 5, wherein, following an adjustment of the calculated value to the predetermined value of the number of teeth, the third proportionality coefficient is determined again.

8. The method according to claim 1, wherein, during the routine i2), a current value difference is applied to the value of the current used in the step a) of the routine i1).

9. The method according to claim 8, wherein the current value difference applied is positive or negative.

10. The method according to claim 8, wherein, during the routine i2), the current value difference is applied during a predetermined period of a duration of between 20 ms and 500 ms.

11. The method according to claim 8, wherein, during the routine i2), the current value difference is applied during a predetermined period of a duration of the order of 100 ms.

12. The method according to claim 1, wherein the step i) of determining the value of the second proportionality coefficient is implemented after detection of an abrupt variation of the longitudinal resultant of the total torque, of a speed of rotation of the motor or of a speed of rotation of the crankset.

13. The method according to claim 1, wherein the first given instant ($t_1$) is chosen at a moment where the torque exerted by the cyclist varies little, which corresponds to a position where crankarms of the crankset are in or close to their vertical position.

14. The method according to claim 1, wherein the predetermined axis (X; X') set with respect to the frame of the bicycle, according to which the value of the longitudinal resultant is calculated in the step c), is offset angularly about an axis of rotation (Z) of the crankset and with respect to an axis (X) of the frame, by an angle of nonzero value.

15. An electric power-assisted bicycle comprising a frame, a crankset, an assistance motor mounted on the frame, and a control logic circuitry programmed to implement a control method according to claim 1.

* * * * *